United States Patent [19]

Stocker

[11] Patent Number: 5,050,443
[45] Date of Patent: Sep. 24, 1991

[54] STEERING WHEEL RETURN ASSIST DEVICE

[75] Inventor: Raymond Stocker, Farmington Hills, Mich.

[73] Assignee: Ford Motor Company, Dearborn, Mich.

[21] Appl. No.: 615,664

[22] Filed: Nov. 19, 1990

[51] Int. Cl.⁵ .......................... B62D 1/16; B62D 5/02; F16F 1/10

[52] U.S. Cl. .................................. 74/492; 180/79.3; 267/150; 267/156

[58] Field of Search ........................ 74/492; 180/79.3; 267/150, 156; 280/89, 271

[56] References Cited

U.S. PATENT DOCUMENTS

| | | | |
|---|---|---|---|
| 910,974 | 1/1909 | Veitch | 267/156 X |
| 2,075,567 | 3/1937 | Benedek | 280/89 |
| 2,714,000 | 7/1955 | O'Connor et al. | 267/156 |
| 3,317,253 | 5/1967 | Löffler et al. | 74/492 X |
| 3,636,794 | 1/1972 | Van Wicklin, Jr. | 74/495 |
| 4,365,690 | 12/1982 | Zavatkay et al. | 267/156 X |

FOREIGN PATENT DOCUMENTS 101790 4/1963 Norway .

Primary Examiner—Allan D. Herrmann
Assistant Examiner—David W. Laub
Attorney, Agent, or Firm—Raymond L. Coppiellie; Roger L. May

[57] ABSTRACT

Steering wheel return assist mechanism for use in a vehicle having a steering column assembly rotatably supporting a steering shaft comprises a spring operated return assist device which permits a limited degree of free rotation of the steering shaft before activation of the mechanism. The return assist device urges the shaft and the steering wheel to a near central neutral position after rotation of the steering wheel. In a second embodiment, a second return assist means structured substantially the same and spaced axially apart and inverted along the steering shaft from the first return assist means is disclosed so that the steering shaft is urged to a near central neutral position after the steering wheel has been turned in either direction.

22 Claims, 3 Drawing Sheets

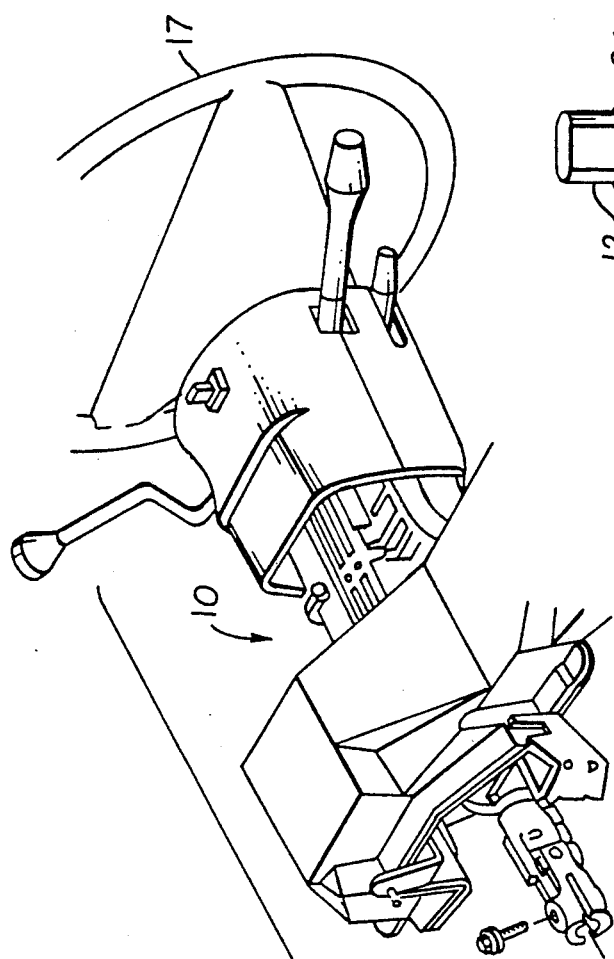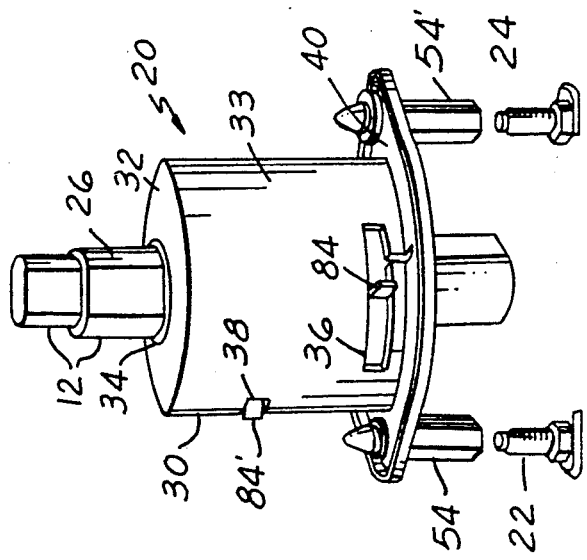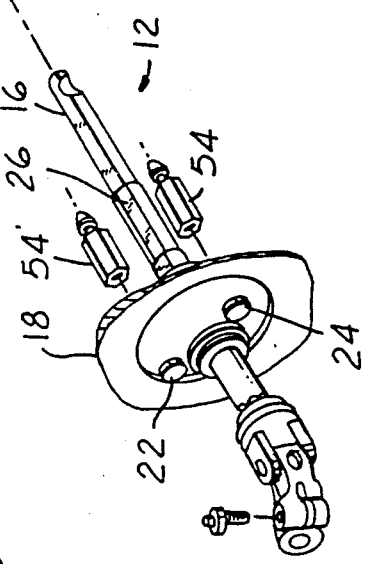

STEERING WHEEL RETURN ASSIST DEVICE

BACKGROUND OF THE INVENTION

1. Field of the Invention

The present invention relates generally to spring assisted return mechanisms. More particularly, the present invention relates to a steering wheel return assist apparatus having a spiral spring and which permits a limited degree of free rotation of the steering wheel before the activation of the return assist device.

2. Disclosure Information

A known steering gear used in many vehicles today is a rack and pinion type steering gear wherein a pinion gear connected to the steering shaft of a steering column assembly meshingly engages a plurality of gear teeth exposed upon a rack member. Rotating the steering wheel causes the pinion gear to rotate in the gear teeth of the rack member, causing reciprocal movement of the rack member to thereby steer the road wheels of the vehicle. After a turn has been made, the torque produced by the steering wheels in conjunction with the tie rods and the rack member often cause the pinion gear to travel to its basic neutral position. However, due to the weight of the vehicle and other such factors such as friction between the rack and pinion as well as in the steering column itself, the steering wheel often does not return to a near central neutral position without some effort by the driver of the vehicle. This can be annoying to the driver of the vehicle particularly during slight turns or while driving at highway speeds. Therefore, there is a need for a steering wheel return assist mechanism to return the steering wheel to the near central neutral position after a turn to facilitate ease in handling of the vehicle. In this respect, it would be advantageous to allow the steering shaft to freely rotate a limited amount before the return assist apparatus was activated to prevent over-steering of the vehicle due to the added assist from the mechanism especially while maintaining straight ahead driving.

Various spring assisted return devices have been proposed which utilize a spring to bias a shaft to a near central neutral position after the shaft has been rotated. For example, U.S. Pat. No. 2,714,000 discloses a mechanism for returning a deflected instrumentality to a central zero position. This mechanism discloses the use of a dual spring mechanism wherein each of the springs are directly in contact with the rotating shaft of the measuring device. The device however, does not allow for limited degree of free rotation of the shaft before actuation of the spring mechanism.

U.S. Pat. No. 3,636,794, assigned to the Assignee of the present application, and Norwegian Patent No. 101,790 also disclose spiral springs employed as return assist mechanisms. The '794 patent discloses the use of a single spiral spring as a steering return assist mechanism but does not teach or suggest the use of such spring in a device wherein a limited degree of free rotation of the shaft is permitted. The Norwegian Patent discloses the use of a pair of spiral springs in a arrangement for connecting a drive arrangement depending upon the changing workloads. The springs also do not allow a limited degree of free rotation of the driving shaft.

It is a feature of the present invention to provide a steering wheel return assist mechanism which permits a limited degree of free rotation of the steering shaft before engagement of the spiral spring of the apparatus.

It is an object of the present invention to provide a steering wheel return assist mechanism which includes a first and second return assist devices to return the steering wheel to a near central neutral position after the steering wheel has been turned in either direction.

These and other objects and features of the present invention will be apparent from the drawings, description and claims which follow.

SUMMARY OF THE INVENTION

There is disclosed herein a steering wheel return assist apparatus for use in a vehicle steering system having a steering column assembly rotatably supporting a steering shaft, the shaft having one end connected to a steering gear and its other end connected to a steering wheel. The apparatus comprises a housing having an aperture for receiving the shaft therethrough and further includes means for permitting a limited degree of free rotation of the shaft within the housing before activation of the apparatus. The apparatus further comprises first return assist means operatively associated with the shaft and disposed in the housing for urging the shaft and the steering wheel to a near central neutral position after rotation of the steering wheel.

The first return assist means includes a spool having an aperture for receiving the steering shaft therethrough, spring means for transmitting a spring force to the shaft in a direction opposite to the rotation of the steering wheel, the spring means engaging the spool upon rotation of the shaft. The first return assist means further includes driver means drivingly engageable with the steering shaft and operatively associated with the spool so that rotation of the shaft causes rotation of the driver means resulting in the winding of the spring means about the spool, whereby the spring means urges the steering shaft and the steering wheel to the near central neutral position.

The housing of the present invention includes at least one slotted aperture, the aperture defining the means for permitting a limited degree of free rotation of the steering shaft. The spring means of the present invention includes an outer tang disposed at an outer end of the spring means and adapted to engage the slotted aperture after the shaft has rotated freely a predetermined distance.

In a second embodiment of the present invention, the steering wheel return assist apparatus includes a second return assist means having generally the same internal structural elements as the first return assist means. The second return assist means is spaced axially apart and inverts from the first return assist means in a mirror-like image and imparts a spring biasing force in a direction opposite to that which the first return assist means imparts on the steering shaft. By employing a pair of return assist means, the steering shaft and the steering wheel may be returned to a near central neutral position after the steering wheel has been turned in either direction. In the second embodiment, the housing of the return assist apparatus includes a second slotted aperture for engaging an outer tang of the second spring means of the second return assist means in generally the same manner as described with respect to the first return assist mechanism.

BRIEF DESCRIPTION OF THE DRAWINGS

Reference will now be made to the following drawings in which:

FIG. 1 is a perspective view, partially exploded, of a steering column assembly utilizing a steering wheel return assist mechanism structured in accord with the principles of the present invention;

FIG. 2 is a perspective view of the steering wheel return assist mechanism of the present invention;

DETAILED DESCRIPTION OF THE PREFERRED EMBODIMENTS

Figure 3:
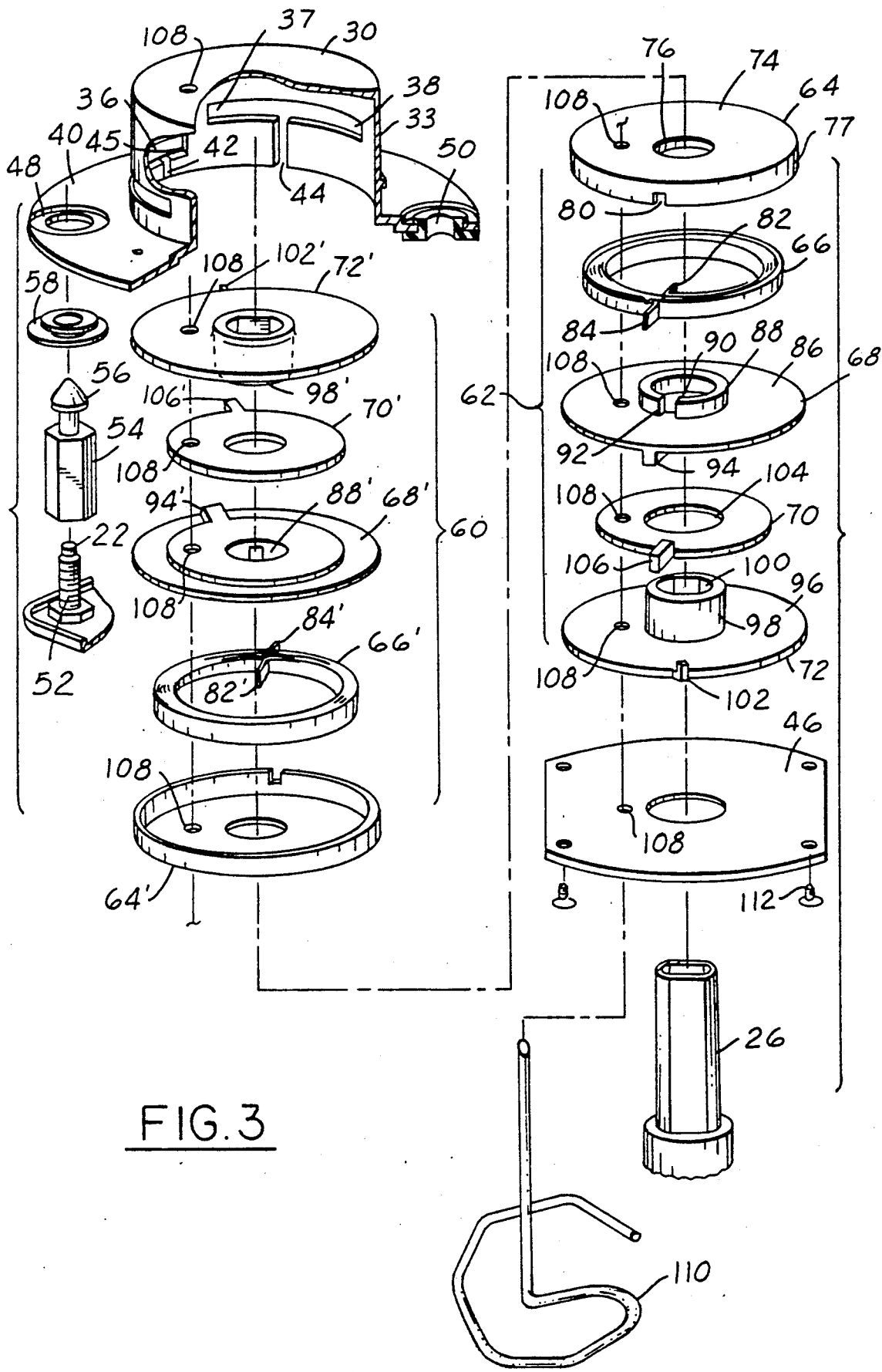
FIG. 3 is an exploded view of the steering wheel return assist mechanism of the present invention.
Figure 4:
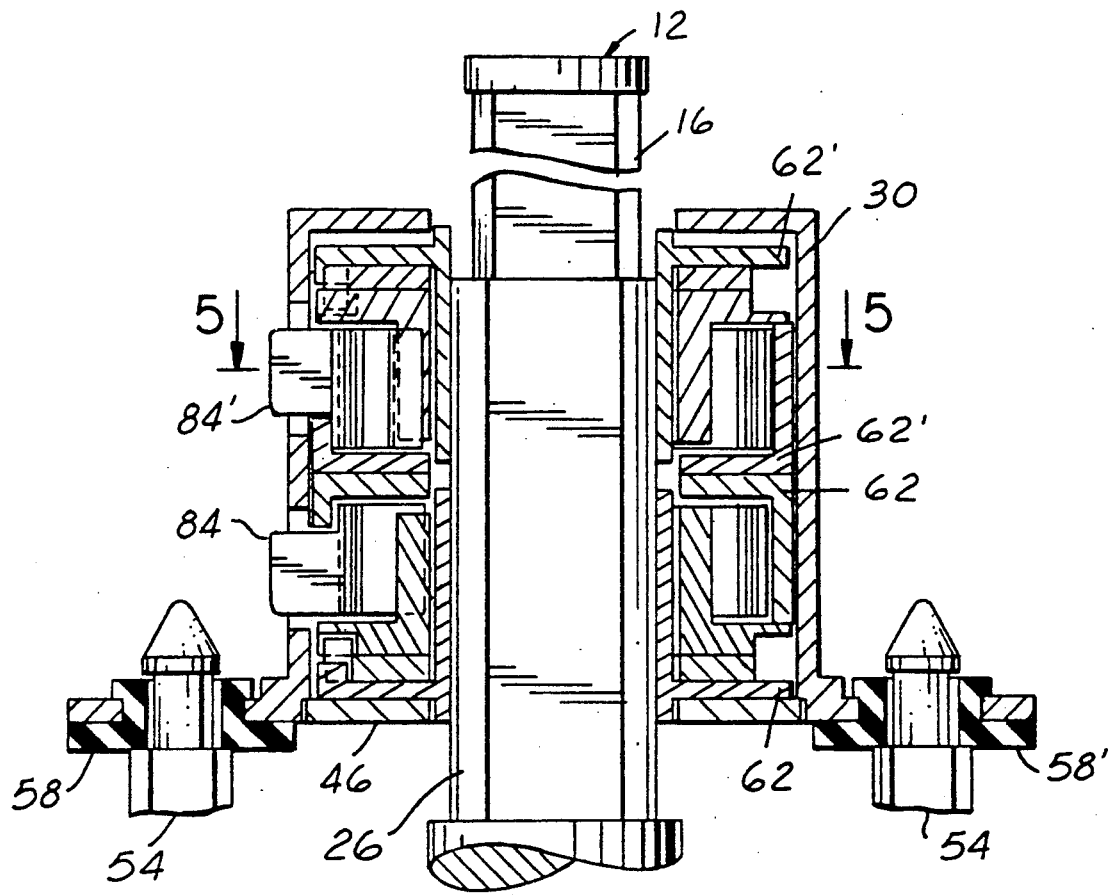
FIG. 4 is a cross sectional, side elevational view of the steering wheel return assist mechanism of the present invention.
Figure 5:
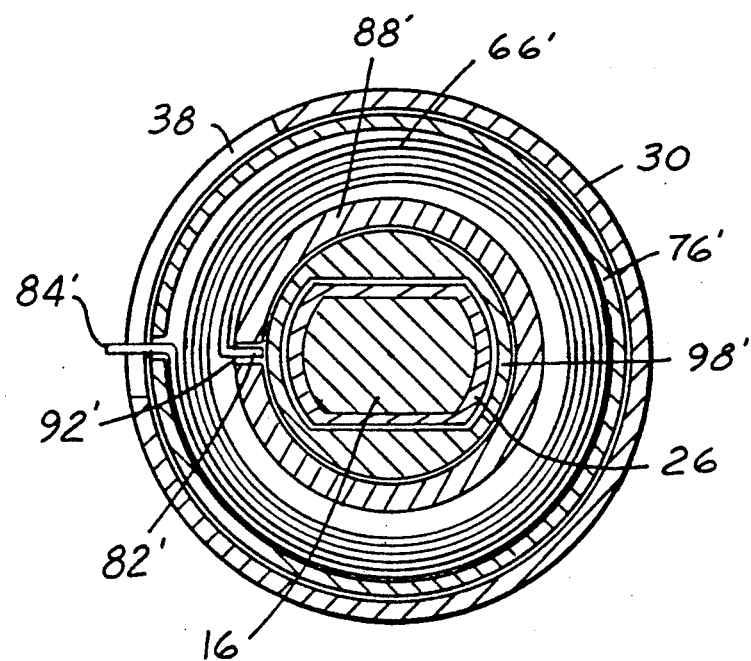
FIG. 5 is a cross sectional view along line 5—5 of FIG. 4.

Referring now to the drawings, FIG. 1 shows a steering column assembly 10 and a steering shaft assembly 12 rotatably mounted therein. Steering shaft assembly 12 includes a lower end 14 which connects with a steering linkage and an upper end 16 for connection with the steering column assembly 10 and a steering wheel 17. A support device, such as the vehicle dash panel 18, engages the steering shaft assembly 12 to secure the steering shaft assembly 12 to the vehicle chassis. A return assist apparatus 20, as shown in FIG. 2, surrounds an intermediate steering shaft member 26 of steering shaft assembly 12 and is connected to the dash panel 18 by means of fasteners 22, 24. The return assist apparatus 20 biases the steering wheel 17 to a near central neutral position after the steering wheel has been turned in either direction. It should be apparent to those skilled in the art that return assist apparatus 20 can be disposed anywhere along the length of the steering shaft member 26.

As shown in FIG. 2, the steering shaft assembly 12 passes through an aperture 34 located within the return assist apparatus 20. In the embodiment shown in FIG. 2, the steering shaft assembly 12 is connected to the intermediate steering shaft 26 by means of a number of known fastening devices, such as by a shear tang for example. The return assist apparatus 20 includes a cup-shaped housing 30 having a generally planar top surface 32 including an aperture 34 through which the steering shaft assembly 12, 26 passes. The housing 30 further includes a generally cylindrical wall 33 depending perpendicularly from the top surface 32. The wall 33 includes a pair of slots 36, 38 which will be described in detail below. The apparatus 20 further includes a substantially planar bottom surface 40 through which fasteners 22, 24 project to secure the return assist apparatus 20 to the dash panel 18. As shown in FIG. 3, each of the fasteners 22, 24 includes a threaded portion 52 matingly engaging an outer stud housing 54 having a projecting tab 56 thereon. A self-retainable pliable bushing 58 is snapped into an aperture 48 of the bottom surface 40 of housing 30. The tab 56 projects through bushing 58 for securing the housing to the dash panel. The pliable bushing prevents rattling of the the return assist apparatus and compensates for misalignment of the apparatus during installation.

Referring now to FIG. 3, the cylindrical walls 33 of housing 30 further include a pair of T-shaped slots 36, 38. Each of these slots includes a vertically depending portion 42, 44 respectively. As will be explained more fully below, slots 36, 38 define a means for permitting a limited degree of free rotation of the steering shaft within the housing before actuation of the return assist apparatus.

The steering wheel return assist apparatus 20 further includes return assist means, such as is shown by upper and lower return assist devices 60, 62 respectively. Each of these return assist devices 60, 62 contain the identical structural components, except that the lower return assist device 62 is spaced axially apart and inverted from the upper return assist device 60. Therefore, for ease and clarity of description, only the structural elements of the lower return assist device 62 will be described, it being understood that the identical structure will be found in the upper return assist device 60. Furthermore, it should be readily apparent to those skilled in the art that the present invention need include only one return assist device to bias the steering wheel to a near central neutral position after the steering wheel has been turned in one direction only. The present invention is not meant to be limited solely to an assembly having two return assist devices for biasing the steering wheel to its near central neutral position after the steering wheel has been turned in either direction.

The lower return assist device 62 (and as explained above, the upper return assist device 60) includes a retainer 64, spring means such as spiral spring 66 and a spool 68 about which the spring 66 winds as will be described later. The lower return assist device 62 further includes a driver plate 72 and an additional driving plate 70 interposed between the spool 68 and the driver plate 72. As will be explained in greater detail below, driver plates 70 and 72 comprise means drivingly engageable with the shaft 26 so that rotation of the shaft 26 causes rotation of the driving plates 70, 72, resulting in winding of spring 66 about spool 68.

The retainer 64 is generally cylindrical and has a generally planar surface 74 including an aperture 76 through which the steering shaft member 26 passes. The retainer 64 further includes a vertically depending wall 77 having a slot 80 defined therein. The slot 80 receives an outer tang 84 of the spring 66 therein to hold the spring 66 at fixed end so that spring 66 may be wound around spool 68 upon turning of the steering wheel. Spring 66 is a constant load spring wherein the force buildup in the spring remains relatively constant during the winding of spring 66. In this manner, the force needed to turn the steering wheel does not substantially increase upon engagement of the return assist apparatus. Other types of springs are well known in the art that are suitable for use in the present invention.

The spool 68 is a generally circular plate having a planar surface 86 and a generally cylindrical wall 88 projecting perpendicularly therefrom. The diameter of wall 88 is less than the diameter of plate 68, and includes a slot 92 therein for receiving an inner tang 82 of the spring 66 therein. Furthermore, the wall 88 is disposed circumferentially around an aperture 90 through which the steering shaft passes. On a side of the spool 68 opposite the planar surface 86 having the wall 88 thereon, the spool includes a tooth member 94 (94' in upper return assist apparatus 60). As can be seen more clearly with respect to the spool 68' of upper return assist apparatus 60, the tooth member 94' may be formed integrally with the spool 68' and may be offset from the plane of the spool by a spaced relationship. As shown in FIG. 3 and as will be explained below, the tooth member 94 engages an additional driver plate 70 so that rotation of driver plate 72 causes rotation of the additional plate 70 and the spool 68.

The driver plate 72 is a generally circular plate having a planar surface 96 and a generally cylindrical wall 98 projecting perpendicularly therefrom. The diameter of the wall 98 is less than the diameter of the driver plate 72 and less than the diameter of wall 88 of spool 68 so as to be concentric therewith. The wall 98 includes an interior surface 100 which matingly and drivingly engages the exterior surface of the steering shaft member 26. In this manner, rotation of the steering shaft member 26 causes rotation of the driver plate 72. The driver plate 72 further includes a tooth member 102 disposed at a radial outer edge thereof for engaging a tooth member 106 of the additional driving plate 70 in a clutch-plate arrangement. The additional driving plate 70 includes an aperture 104 having a diameter greater than the diameter of cylindrical wall 98 of driver plate 72 so that plate 70 contacts plate 72 in a driving relationship. Tooth member 106 cooperates with tooth member 102 of driver plate 72 and tooth member 94 of spool 68 to rotate the spool 68 upon rotation of the steering shaft member 26. The additional plate 70 provides additional unrestricted turning of the steering wheel 17 by allowing the spring 66 to remain in a neutral state when the steering wheel is turned in an opposite direction from the near straight ahead position.

A cover plate 46 secures the entire assembly into a unit by means of threaded fasteners 112. Cover plate 46 also includes an aperture for receiving a steering shaft therethrough. It should be noted that each of the elements of the return assist apparatus 20 includes an aperture 108 for receiving an alignment rod 110 therethrough. The alignment rod 110 is used during the assembly of the return assist apparatus 20 to ensure that all the components are properly placed.

In operation, the outer tangs 84, 84' of the spiral springs of each return assist device, 62, 60 respectively communicate with the slots 38, 36 of housing 30 through the vertical openings 42, 44. After the steering shaft has been rotated clockwise approximately 45-90 degrees, the outer tang 84 of spring 66 contacts the rightmost edge 45 of slot 36. Continual turning of the steering wheel to the right causes the tooth members 102, 106 of the driver plate 72 and the additional plate 70, respectively, to contact the tooth member 94 of the spool 68 causing the spool to rotate in a clockwise direction. The rotation of the spool, including the inner tang 82 disposed in slot 92, forces spring 66 to wind around the wall 88 of spool 68 to create a biasing force in a direction opposite to the direction which the steering shaft is turned. After the vehicle operator completes his turn and relaxes his grip on the steering wheel, the steering return assist apparatus 62 assists the steering wheel to rotate counterclockwise to a near central neutral position.

Similarly, when the vehicle operator makes a left hand turn and turns the steering shaft 26 in a counterclockwise direction, the outer tang 84' of the spring 66' of the upper return assist device 60 contacts the leftmost end 37 of slot 38 in a manner generally similar to that as described above with reference to the lower return assist device 62. Rotation of the shaft 26 in a counterclockwise direction causes the tooth members 102', 106' of the driver plate 72' and the additional plate 70' to engage the tooth member 94' of spool 68' forcing the spool 68' to rotate and wind the spring to create a biasing force in the direction opposite to the rotation of the shaft. When the operator finishes turning of the steering shaft, the spring assists the steering shaft to return to a near central neutral position. The horizontal length of the slots 36, 38 define the limited degree of free rotation of the steering shaft as does the amount of rotation permitted by the rotational fit between the upper 60 and lower 62 return assist devices and the steering shaft member 26. By allowing a limited degree of free rotation of the steering shaft before the outer tangs of the springs engage the ends of the slots 36, 38, the driver of the vehicle is able to turn the wheel slightly without any additional torque on the steering apparatus. This is advantageous in straight ahead driving or when the vehicle operator makes slight turns so that the return assist apparatus does not engage and cause an over-steering effect on the vehicle.

Various modifications will no doubt be apparent to those skilled in the art. For example, the return assist apparatus of the present invention may be manufactured from a variety of materials including metals and synthetic polymeric materials. Furthermore, driving plates 70 may be added to or subtracted from the apparatus to either increase or decrease the amount of apparatus rotation to match the maximum steering wheel rotation in either direction. The amount of rotation of the spring means will depend upon this maximum steering wheel rotation. Therefore, it is the following claims, including all equivalents which define the scope of the invention.

What is claimed is:

1. A steering wheel return assist apparatus for use in a vehicle steering system having a steering column assembly rotatably supporting a steering shaft, said shaft having one end connected to a steering gear and its other end connected to a steering column assembly having a steering wheel, said apparatus comprising:

a housing including an aperture for receiving said shaft therethrough and further including means for permitting a limited degree of free rotation of said shaft within said housing;

first return assist means operatively associated with said shaft and disposed in said housing for urging said shaft and said steering wheel to a near central neutral position after rotation of said steering wheel, said first return assist means including:

a spool including an aperture for receiving said shaft therethrough;

spring means for transmitting a spring force to said shaft in a direction opposite to the rotation of said steering wheel, said spring means operative to engage said spool upon rotation of said shaft;

driver means drivingly engageable with said shaft and operatively associated with said spool so that rotation of said shaft causes rotation of said driver means, resulting in the winding of said spring means about said spool whereby said spring means urges said shaft and said steering wheel to said near central neutral position.

2. A steering wheel return assist apparatus according to claim 1, wherein said housing includes a slotted aperture, said aperture defining said means for permitting a limited degree of free rotation of said shaft in said housing.

3. A steering wheel return assist apparatus according to claim 2, wherein said spring means includes an outer tang disposed at an outer end of said spring means and adapted to engage said slotted aperture after said shaft has rotated freely a predetermined distance.

4. A steering wheel return assist apparatus according to claim 1, wherein said spool comprises a generally planar disc having a generally cylindrical wall projecting perpendicularly from the plane of said disc, said wall having a diameter less than the diameter of said spool.

5. A steering wheel return assist apparatus according to claim 4, wherein said wall includes a notch adapted to engage an inner end of said spring means.

6. A steering wheel return assist apparatus according to claim 4, wherein said spool further includes a tooth disposed on the side of said disc opposite said wall, said tooth operative to engage said driver means to cause said spool to rotate in response to rotation of said driver means.

7. A steering wheel return assist apparatus according to claim 1, wherein said driver means includes a first substantially planar disc having a generally cylindrical wall projecting perpendicularly from one side thereof.

8. A steering wheel return assist apparatus according to claim 7, wherein said wall includes an aperture adapted to drivingly engage said shaft.

9. A steering wheel return assist apparatus according to claim 7, wherein said first disc further includes a tooth disposed on the same side of said disc as said wall, said tooth operative to contact said tooth of said spool upon rotation of said shaft.

10. A steering wheel return assist apparatus according to claim 7, wherein said driver means further includes at least one additional substantially planar disc interposed between said spool and said first planar disc.

11. A steering wheel return assist apparatus according to claim 10, wherein said at least one additional disc includes a tooth projecting radially therefrom and adapted to contact said tooth of said first disc upon rotation of said shaft.

12. A steering wheel return assist apparatus according to claim 1, wherein said apparatus further includes a second return assist means operatively associated with said shaft and disposed in said housing for urging said shaft and said steering wheel in a direction generally opposite that of said first return assist means.

13. A steering wheel return assist apparatus for use in a vehicle steering system having a steering column assembly rotatably supporting a steering shaft, said shaft having one end connected to a steering gear and its other end connected to a steering wheel, said apparatus comprising:
   a housing including an aperture for receiving said shaft therethrough and further including means for permitting a limited degree of free rotation of said shaft within said housing;
   a pair of return assist means operatively associated with said shaft and disposed in said housing for urging said shaft and said steering wheel to a near central neutral position after rotation of said steering wheel in either direction from said near central neutral position, each one of said pair of return assist means including:
   a spool including an aperture for receiving said shaft therethrough;
   spring means for transmitting a spring force to said shaft in a direction opposite to the rotation of said steering wheel, said spring means operative to engage said spool upon rotation of said shaft;
   driver means matingly engageable with said shaft and operatively associated with said spool so that rotation of said shaft causes rotation of said driver means, resulting in the winding of said spring means about said spool whereby said spring means urges said shaft and said steering wheel to said near central neutral position.

14. A steering wheel return assist apparatus according to claim 13, wherein said housing includes a pair of apertures, said pair of apertures defining said means for permitting a limited degree of free rotation of said shaft in said housing.

15. A steering wheel return assist apparatus according to claim 14, wherein each of said spring means includes a tang disposed at an outer end thereof, each of said tangs adapted to engage one of said pair of said slotted apertures after said shaft has rotated freely a predetermined distance from said near central neutral position.

16. A steering wheel return assist apparatus according to claim 13, wherein each of said spools comprises a generally planar disc having a generally cylindrical wall projecting perpendicularly from the plane of said disc, each of said walls having a diameter less than the diameter of said spools.

17. A steering wheel return assist apparatus according to claim 16, wherein each of said walls includes a notch adapted to engage an inner end of one of said pair of spring means of said pair of return assist means.

18. A steering wheel return assist apparatus according to claim 16, wherein each of said spools further includes a tooth disposed on the side of said disc opposite said wall, said tooth operative to engage said driver means to cause said spool to rotate in response to rotation of said driver means.

19. A steering wheel return assist apparatus according to claim 13, wherein each of said driver means includes a first substantially planar disc having a generally cylindrical wall projecting perpendicularly from one side thereof.

20. A steering wheel return assist apparatus according to claim 19, wherein each of said driver means further includes a second substantially planar disc interposed between said spool and said first planar disc.

21. A steering wheel return assist apparatus according to claim 14, wherein each one of said pair of return assist means further includes a generally circular, cup-shaped retainer operative to house a respective one of said spools, said spring means and said driver means.

22. A steering wheel return assist apparatus for use in a vehicle steering system having a steering column assembly rotatably supporting a steering shaft, said shaft having one end connected to a steering gear and its other end connected to a steering wheel, said apparatus comprising:
   a housing including an aperture for receiving said shaft therethrough and a pair of slotted apertures for permitting a limited degree of free rotation of said shaft from a near central neutral position;
   a pair of return assist means axially aligned on said shaft and disposed in said housing for urging said shaft and said steering wheel to said near central neutral position after rotation of said steering wheel in either direction from said near central neutral position, each one of said pair of return assist means including:
   a spool comprising a generally planar disc having a generally cylindrical wall projecting perpendicularly therefrom and including an aperture for receiving said shaft therethrough, each one of said spools including a tooth member disposed on the side of said disc opposite said wall;

a spiral spring operative to transmit a spring force to said shaft in a direction opposite to the rotation of said steering wheel, said spring having a tang disposed at an exterior end thereof and an inner end adapted to engage said spool upon rotation of said shaft;

driver means matingly engageable with said shaft comprising a first and second substantially planar discs, each of said disc including a tooth disposed on one side of said discs and operative to engage said tooth member of spool upon rotation of said shaft, said first disc further including a generally cylindrical wall projecting perpendicularly from the plane of said disc and including an aperture adapted to matingly engage said shaft, so that rotation of said shaft causes rotation of said driver means, resulting in the winding of one of said spring means about said spool whereby said spring means urges said shaft and said steering wheel to said near central neutral position.

* * * * *